UNITED STATES PATENT OFFICE.

JOHN HERMAN, OF CANON CITY, COLORADO.

PROCESS OF TREATING ORES.

SPECIFICATION forming part of Letters Patent No. 707,107, dated August 19, 1902.

Application filed March 28, 1902. Serial No. 100,457. (No specimens.)

*To all whom it may concern:*

Be it known that I, JOHN HERMAN, a citizen of the United States, residing at Canon City, in the county of Fremont and State of Colorado, have invented new and useful Improvements in Processes of Treating Ores, of which the following is a specification.

My invention relates to the extraction of copper from ores; and it consists in a certain peculiar process, the novelty, utility, and advantages of which will be fully understood from the following description and claims.

In carrying out one embodiment of my invention I roast sulfid-of-copper ore at a low heat and control the temperature so as to obtain the best results. The roasting of the ore at a low heat forms sulfates of the copper and of some of the iron present instead of oxids of said metals, which would result from the use of a high heat. Silver, if present, may or may not be entirely converted into sulfate, this depending on whether or no the residue resulting from the leaching, presently described, is to be subjected to treatment. The roasting of the sulfid ore at a low heat is also desirable, because of the production of a large percentage of ferrous sulfate instead of a large portion of ferric sulfate or oxid, the ferrous sulfate being susceptible of use in the further treatment of carbonate or oxid ores of copper, as hereinafter pointed out. After roasting the ore as stated I leach it, preferably while still hot, with water, when the copper and iron sulfates will dissolve, as will also any silver sulfate that has been formed. I then, if silver is present, pass the solution through or over copper turnings to effect the precipitation of the metallic silver and through or over scrap-iron, whereby the metallic copper is precipitated. If no silver is present or it is not desired to recover the same, the solution is passed through the scrap-iron alone. The use of the scrap-iron as a precipitant for the copper increases the amount of ferrous sulfate

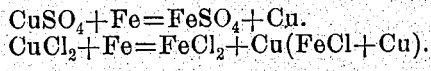

The said ferrous sulfate is highly desirable, as before stated, for further operations.

It is necessary in order to fulfil the purpose of the process to convert the ferrous salts to the chlorid and to produce a solution having an excess of salt—*i. e.*, a greater proportion of salt than ferrous chlorid—preferably two parts, by weight, of salt to one part of ferrous chlorid. This is done in the present embodiment of the invention by adding sodium chlorid to the solution either before or after precipitating the metals.

If the residue from the leaching contains gold, the same may be treated by any of the ordinary modes with a view of saving the gold. It will also be observed that the ores are rendered free milling and that the process may be used to accomplish this purpose, as well as to save copper and silver.

The solution of ferrous chlorid and salt obtained in the manner described is highly efficient in dissolving copper and such silver as is in amenable compounds out of carbonate and oxid ores and is used for such purpose. Then after leaching precipitation is carried on as before stated and with the same advantage—viz., the formation of ferrous sulfate. This ore in most cases is also rendered free milling, and if gold or silver is present in the residue they may be saved by the methods ordinarily practiced.

The reaction whereby copper is dissolved by ferrous chlorid and salt is

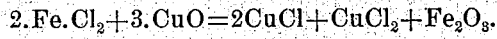

The cupric chlorid is soluble in water, as is also cuprous chlorid when in the presence of the other chlorids.

It will be readily appreciated that the embodiment of my invention described is materially advantageous, because instead of expensive chemicals it utilizes waste products, also because the solution of ferrous chlorid and salt may be repeatedly used to advantage.

In another and preferred embodiment of my invention I roast the residue from the first leaching with three (more or less) per cent. of common salt and at a higher heat than in the first roasting, but not sufficiently high to decompose the chlorids of copper and silver which are formed. In this roasting of the residue the sulfur should be in excess of the copper, and, if deficient, the necessary sulfur is supplied by the addition of fresh pyrites. The roasted residue is then leached with a salt solution which is preferably quite strong, after which the salt solution is mixed with the first-described leaching solution and passed with the same preferably, but not necessarily, through or over copper turnings to precipitate metallic silver, if present, and then through scrap-iron, the latter to precipitate metallic copper. If no silver is present, the mixed solutions are passed through the iron scraps alone, and in this connection I desire it understood that when preferable the solutions may be treated separately—i. e., may be passed through the copper turnings and the iron scraps or through the iron scraps alone—precedent to being mixed. When the roasting of the residue of the first leaching is resorted to, the conversion of the ferrous salts to the chlorid is effected, and the excess of salt in the solution of ferrous chlorid and salt is obtained by mixing the first-described leaching solution with that used in leaching the roasted residue. This solution of ferrous chlorid and salt is then used to dissolve copper and silver out of carbonate and oxid ores, after which leaching and precipitation are carried on in the same manner as in the first-described embodiment of the invention.

All of the advantages of the first-described embodiment of my invention are common to that last described, and the latter is also advantageous, because copper and silver which may have escaped the first treatment is saved by the second, and a larger percentage is saved by roasting twice than by roasting in either way alone. Moreover, less salt need be used than in roasting by the second mode only, and less obnoxious gases are formed.

In both embodiments of my invention the raw ore may be roasted once and salt added, whereby any ferrous sulfate is converted to ferrous chlorid. This renders soluble any copper oxid or carbonate originally present or formed in the roasting. The solution obtained by precipitating the copper may be also turned back over the residue.

Having described my invention, what I claim, and desire to secure by Letters Patent, is—

1. The process described which consists in roasting sulfid-of-copper ore at a low heat to form sulfates of the copper and some of the iron present, and produce a large percentage of ferrous sulfate, leaching the roasted ore, precipitating the metallic copper, and adding salt to the leaching solution, before or after the precipitation of the metallic copper, whereby the ferrous salts in the solution are converted to the chlorid and a solution having an excess of salt is produced, and the said solution is adapted to dissolve copper and silver out of carbonate and oxid ores.

2. The process described which consists in roasting sulfid-of-copper ore at a low heat to form sulfates of the copper and some of the iron present and produce a large percentage of ferrous sulfate, leaching the roasted ore, precipitating the metallic copper with iron scraps whereby the proportion of ferrous sulfate in increased, and adding salt to the leaching solution, before or after the precipitation of the metallic copper, whereby the ferrous salts in the solution are converted to the chlorid and a solution having an excess of salt is produced, and the said solution is adapted to dissolve copper and silver out of carbonate and oxid ores.

3. The process described which consists in roasting sulfid-of-copper ore at a low heat to form sulfates of the copper and some of the iron present, and produce a large percentage of ferrous sulfate, leaching the roasted ore, precipitating the metallic copper, adding salt to the leaching solution, before or after the precipitation of the metallic copper to convert the ferrous salts in the solution to the chlorid and a solution having an excess of salt is produced, leaching carbonate and oxid ores with the solution, and precipitating the metallic copper therefrom.

4. The process described which consists in roasting sulfid-of-copper ore at a low heat to form sulfates of the copper and some of the iron present, and produce a large percentage of ferrous sulfate, leaching the roasted ore, roasting the residue from the leaching in the presence of common salt, leaching the roasted residue with a salt solution, precipitating the metallic copper from the solutions, and commingling the two solutions before or after the precipitation of the metallic copper for the purpose described.

In testimony whereof I have hereunto set my hand in presence of two subscribing witnesses.

JOHN HERMAN.

Witnesses:
B. I. DAWSON,
W. W. RICE.